United States Patent Office 3,174,092
Patented Mar. 16, 1965

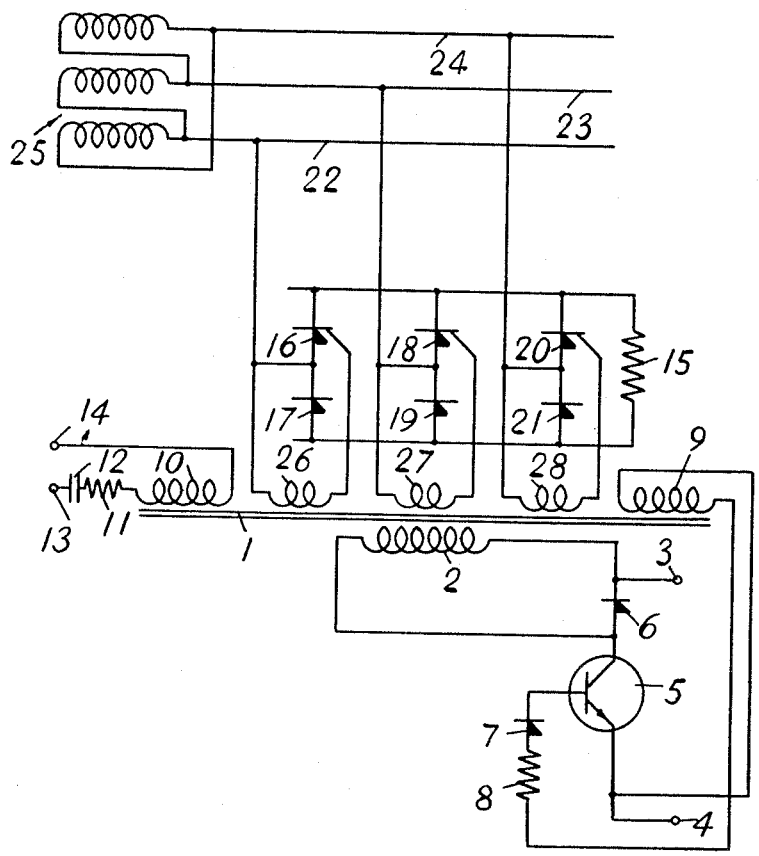

3,174,092
MEANS FOR PREVENTING THE OUTPUT OF A GENERATOR FROM RISING SHARPLY UPON REMOVAL OF A LOAD
Edwin William Johnson, Wigginton, Tring, England, assignor to Rotax Limited, London, England
Filed Apr. 11, 1962, Ser. No. 186,761
Claims priority, application Great Britain, May 1, 1961, 15,630/61
1 Claim. (Cl. 322—98)

This invention relates to single or multi-phase alternating current generators such as those used for driving asdic or radar transmitters, where the load to which the generator is subjected is removed suddenly at periodic intervals.

The object of the invention is to provide in combination with such a generator means for preventing the output voltage of the generator from rising sharply upon removal of the load.

Throughout this specification reference will be made to controlled rectifiers, by which is meant a semi-conductor device having an anode, a cathode and a gate terminal, the characteristic of the device being that conduction commences when a predetermined triggering voltage is applied to the gate terminal and thereafter continues until the anode-cathode current drops practically to zero.

Means in accordance with the invention comprises a transformer having a saturable core, a primary winding on the core and adapted for connection to a source of direct current through the emitter-collector terminals of a transistor, a control winding on the core for controlling conduction of the transistor, a pilot winding on the core and adapted for connection to a source of signals representing the removal of the load from the generator, said pilot winding serving to control current flow in the control winding, and one or more secondary windings on the core and connected respectively between the phase line or lines of the generator and the gate terminal or terminals of one or more controlled rectifiers, said controlled rectifier or rectifiers forming part of a rectifier through which the or each phase line of the generator is connected to a resistor, and the arrangement being such that the or each controlled rectifier is rendered conductive, each time a load is removed from the generator, until the transformer core is saturated.

The accompanying drawing is a circuit diagram illustrating one example of the invention as applied to a 3-phase generator.

Referring to the drawing, there is provided a transformer 1 having a saturable core on which is wound a primary winding 2. One end of the winding 2 is connected to a terminal 3 forming one of a pair of terminals 3, 4 adapted for connection to a source of direct current which may be constituted by a battery or by the rectified output of an alternator. The other end of the winding 2 is connected to the terminal 4, through the collector and emitter of a n-p-n type transistor 5.

The collector of the transistor 5 is further connected to the terminal 3 through a diode rectifier 6, whilst its base is connected through a diode rectifier 7 and resistor 8 in series to one end of a control winding 9 on the core, the other end of the control winding 9 being connected to the emitter of the transistor 5. Moreover, also on the core is a pilot winding 10 connected through a resistor 11 and a capacitor 12 to a pair of terminals 13, 14 which are connected to the generator so as to receive signals in the form of negative and positive going pulses respectively when a load is imposed on or removed from the generator.

There is further provided a full wave rectifier connected in parallel with a load resistor 15. The rectifier consists of three pairs of rectifiers 16, 17, 18, 19, 20, 21 connected in parallel, the rectifiers 16, 18, 20 being controlled rectifiers. Points intermediate the rectifiers of each pair are connected to the phase lines 22, 23, 24 of the generator 25 respectively, and in addition to three secondary windings 26, 27, 28 on the core, the other ends of the windings 26, 27, 28 being connected respectively to the gates of the controlled rectifiers 16, 18, 20.

In operation, when the pilot winding 10 receives a signal corresponding to the removal of the load from the generator, a voltage is induced in the control winding 9 to render the transistor 5 conductive, and thereby allow a flow of current to the primary winding 2. This in turn induces a further voltage in the control winding 9 to bias the transistor further, and hence current flow increases until the transformer core is saturated. The increasing current in the primary induces a voltage in the secondary windings 26, 27, 28 to render the controlled rectifiers 16, 18, 20 conductive so that current can flow from the phase lines 22, 23, 24 through the full wave rectifier and the load resistor 15 until the core becomes saturated.

The pilot winding 10 also receives signals corresponding to a load being imposed on the generator. However, these signals will be of opposite polarity to those required to render the transistor 5 conductive, and will therefore have no effect on the apparatus.

It will be appreciated that the invention can equally well be applied to single-phase, or to other multi-phase generators. Moreover, if desired the rectifiers 17, 19, 21 could be omitted in the example described so that current only flows through the load 15 during alternate half-cycles when the controlled rectifiers 16, 18, 20 are conductive.

Having thus described my invention what I claim as new and desire to secure by Letters Patent is:

Means for preventing the output voltage of an A.C. generator from rising sharply upon removal of a load therefrom, comprising a transformer having a saturable core, a transistor, a primary winding on the core and adapted for connection to a source of direct current through the emitter-collector terminals of said transistor, a control winding on the core for controlling conduction of the transistor, a pilot winding on the core and adapted for connection to a source of signals representing the removal of the load from the generator, said pilot winding serving to control current flow in the control winding, a number of controlled rectifiers equal in number to the number of phases of the generator, a resistor, rectifying means through which said phases are connected to the resistor, said rectifying means incorporating said controlled rectifiers, a number of secondary windings on said core equal in number to the number of controlled rectifiers and connected between the phase lines of the generator and the gate terminals of the controlled rectifiers, current flow through the transistor to the primary winding when a load is removed from the generator inducing a voltage in each secondary winding to render each controlled rectifier conductive and so permit current flow through said resistor until the transformer core is saturated.

References Cited by the Examiner
UNITED STATES PATENTS
2,948,843   8/60   Klein _____ 307—39
3,059,169  10/62   Raver et al. _____ 322—98

LLOYD McCOLLUM, Primary Examiner.